Patented Aug. 4, 1936

2,049,467

UNITED STATES PATENT OFFICE 2,049,467

PRODUCTION OF ALIPHATIC POLYAMINES

Nathan M. Mnookin, Kansas City, Mo.

No Drawing. Application August 3, 1931, Serial No. 554,935

11 Claims. (Cl. 260—127)

The present invention relates to improvements in the production of aliphatic amino compounds, and more particularly to the production of olefin-polyamines.

Various methods have hitherto been proposed for the production of individual olefin-polyamines, such methods depending upon various synthesizing reactions, such as the reduction of olefin cyanides and upon the direct reaction of ammonia in concentrated alcoholic solution on olefin dihalides. The methods hitherto employed are tedious and inefficient, requiring a long period of time and resulting in low yields, and as a result these amines have hitherto been available only in limited quantities at extremely high prices.

By operating in accordance with the present invention, I am able to produce olefin-polyamines at low cost and with high yields and as a result, I have made available various olefin-polyamines and mixtures thereof, some of which have hitherto been produced and others of which are not hitherto known, for commercial use.

In carrying out the process of the present invention, I employ the olefin-dihalides or mixtures thereof, and react upon them at temperatures above 120° C. and preferably of at least 135 to 140° C. with ammonia in the presence of substantial proportions of water vapor, in general with relative proportions of water by weight at least seven times and preferably in excess of ten times the proportion of ammonia used.

In carrying out the reaction, the olefin-dihalide and ammonia are heated together in the presence of a large excess of water, as hereinbefore set forth, temperatures in excess of 120° C. and preferably in excess of 140° C. The heating may suitably be effected in a pressure container, autoclave or the like, into which the desired proportions of the reacting materials are charged, a pressure being maintained on the receiver such that the required temperatures can be attained therein. Or the constituents which are intended to react may be admixed in the desired proportions and the mixture forced through a continuous coil, externally heated by direct firing, by a lead bath or the like to secure the required temperature therein.

The proportions of ammonia employed may be varied, but in general I prefer to employ sufficient to provide for complete reaction between the ammonia and the halogen of the olefin-dihalide; that is, so as to have present at least 2 molecules of $NH_3$ to each molecule of the olefin-dihalide. By increasing the proportion of ammonia, larger proportions of lower polyamines are formed and with reduced proportions of ammonia, larger proportions of higher amines tend to form. By the expression "lower" and "higher" polyamines, reference is made to the number of amino groups.

The use of a high proportion of the water in the reaction mixture I have found to be extremely important in securing rapidity of reaction and completeness of reaction. Thus, with a proportion of water present approximately 18 times that of ammonia by weight, at a temperature of about 140° C., and preferably not above 300° C., the reaction may be completed with a substantially complete conversion of the olefin-dihalide to polyamines in about one-half hour. With a reduction of the proportion of water to about four times that of ammonia, under the same conditions, after 3 hours heating, the reaction is found to be incomplete.

The reaction product is a mixture of olefin-polyamines in varying proportions, depending upon the proportions of water, the particular temperatures used, the type of dihalide, the proportion of ammonia and other factors as hereinafter set forth. These factors affect only the relative proportions of the various polyamines, all of which are secured in varying proportions in each case. Furthermore, continued heating of the reaction mixture after the completion of the reaction may cause some variation in the relative proportion of the various polyamines secured. The polyamines may be separated by fractional distillation into individuals or mixtures of individuals, as more fully hereinafter indicated.

The following example illustrates an operation conducted in accordance with the present invention.

The following reagents are placed in a suitable vessel, for example, of iron, capable of withstanding pressure, in the proportions indicated.

| | Parts by volume |
|---|---|
| Water | 1600 |
| Ammonium hydroxide (28% $NH_3$) | 340 |
| Ethylene dichloride | 200 |

The receptacle is heated to bring the reaction mixture to a temperature of 140 to 150° C. As reaction proceeds, the pressure rises to about 150 lbs. gauge, or slightly higher, and in a few minutes, the pressure begins to recede and continues to diminish as the reaction progresses. Complete conversion of the ethylene dichloride into polyamines is secured in about one-half hour. The reaction mixture is cooled and removed and is found to be a clear aqueous solution of the acid salts of the olefin-polyamines with ammonium chloride. On evaporation of the water, the salts contained therein crystallize out. The crystallized salts are treated with sufficient alkali to convert them into the polyamines and distilled. Or the solution may be neutralized, the amines being thereby salted out and separated by decantation. Some ammonia is recovered and the polyamines are found to consist approximately of the following:

| | Per cent, approximately |
|---|---|
| Ethylene diamine (B. P. 118° C.) | 40 |
| Diethylene triamine (B. P. 203° C.) | 30 |
| Triethylene tetramine (B. P. 266° C.) | 20 |
| Higher polyamines | 10 |

The polyamines may be fractionated to yield individual olefin-polyamines, as indicated above, or, on distillation, may be cut to yield fractions of a desired boiling point range and approximate molecular weight, in accordance with the use which it is desired to make of them. All of the ethylene polyamines resulting from the reaction above described are soluble in water, and yield precipitates with oxalic acid, being thereby distinguished from polyamines from other olefins such as those of propylene. They are normally approximately water-white to yellowish in color and are liquid at normal atmospheric temperatures.

The inclusion of some alcohol, say methyl or ethyl alcohol, in the reaction mixture, say to the extent of 5 to 10% on the water present, somewhat accelerates the reaction. At lower temperatures the rate of reaction is somewhat decreased.

While in general, mixtures of the polyamines are secured in carrying out the reaction in accordance with the present invention, the relative proportions of these polyamines to one another may be varied by varying the conditions of reaction. Thus, by replacing the ethylene dichloride with an equivalent proportion of ethylene dibromide, the relative proportion of ethylene diamine and diethylene triamine with respect to the higher amines is increased, and by using ethylene diiodide in a similar manner, a further increase of the relative proportion of the diamine is secured.

In a manner similar to that set forth above, I have prepared propylene polyamines in the following manner.

The reaction vessel, adapted to withstand pressure, is charged with the following:

| | Parts by volume |
|---|---|
| Propylene dichloride | 100 |
| Ammonia (28%) | 130 |
| Water | 800 |

The reaction mixture is heated under confined pressure to a temperature of about 160° C. for a period of about 2 hours, by which time the conversion of the propylene dichloride is completed. The resulting aqueous solution is crystallized as in the previous example, to recover the polyamines as acid salts admixed with the ammonium chloride and the recovered salts are neutralized and subjected to distillation. By suitably controlling the distillation, various individual polyamines can be recovered. Ordinarily, however, the distillate will be separated into cuts of varying boiling points, depending upon the purposes for which they are desired and their average molecular and combining weights. The mixture of polyamines includes tripropylene-tetra-amines, and other propylene polyamines hitherto unknown. Other dihalides of propylene, such as the dibromide and di-iodide may be employed in the reaction in place of the dichloride.

The propylene polyamines thus produced are normally liquid and are soluble in water, being in general yellowish to water-white in color and may be distinguished from the ethylene polyamines in that they do not yield a precipitate with oxalic acid.

The reaction may be made continuous by continuously forcing into the reaction vessel a mixture containing the reaction constituents in the desired proportions and removing therefrom a stream of the reaction products, from which the polyamines may be removed and any residual reagents, not completely utilized returned to the reaction vessel. Furthermore, a continuous reaction may be conducted by passing the reaction constituents in vapor form through a continuous coil suitably maintained at a temperature above 120° C., say 150° to 160° C., the coil being of such length as to permit complete reaction.

The process may likewise be employed for the production of mixed polyamines, for example, by chlorinating the mixtures of olefin hydrocarbons present in cracked gases, refinery gases and the like and subjecting the resulting mixture of chlorinated products to the process.

As pointed out hereinbefore, it is important that water be present in comparatively large proportions in order to secure complete and rapid reaction. The water is believed to act as an intermediate hydrolyzing agent and may be replaced by corresponding proportions of methyl or ethyl alcohol, which, as hydroxyl-yielding liquids, appear to perform a similar function. It is important that the alcohol be similarly used in large proportions and in general it is found that the use of alcohol instead of water in this manner results in the production of larger proportions of the lower polyamines.

The polyamines produced in accordance with the present invention are strongly alkaline, organic bases and their effectiveness as combining agents increases rapidly with increase in the amine proportion. I have found them exceedingly valuable in the preparation of novel soaps, as emulsifying and dispersing agents and in many organic reactions. Their field of utilization is greatly broadened by the fact that they are, in general, water soluble.

They react with the higher fatty acids to form soaps which are, in general, both water and oil soluble. The polyamines selected for soap formation may be secured by the isolation of individual polyamines or by employing cuts of specific boiling point ranges of a desired average combining weight. For example, the combining weight of ethylene diamine is such that one part by weight thereof will neutralize approximately three parts by weight of higher fatty acids such as oleic acid or stearic acid. One part by weight of triethylene tetramine or of dipropylene triamine will neutralize approximately five parts by weight of these acids.

The polyamines may be directly combined with the fatty acids, the combination being effected at normal temperatures with a liquid fatty acid such as oleic acid and preferably at a temperature above the melting point of the normally solid fatty acids such as palmitic and stearic acid. The resulting soaps may be incorporated in various solvents such as naphtha, carbon tetrachloride and the like, forming excellent dry cleaning soaps and textile scouring and wetting agents.

The olefin-polyamines may likewise be employed as such or in their combinations with fatty acids, naphthenic acids, sulfonated fatty and mineral oil products and the like to form emulsifying agents. They are completely miscible in oils and fats and the mixture is readily adapted for the formation of emulsions, water in oil emulsions being formed with small proportions of water and oil in water emulsions being formed with increasing proportions of water. The fatty acid soaps and other compounds hereinbefore referred to may be employed to effect emulsification of fats, mineral oils, waxes, and normally immiscible solvent liquids such as ethylene dichloride, carbon tetrachloride and the like. They may likewise be combined with oils to form greases.

The olefin-polyamines prepared in accordance with the present invention may likewise be employed as dispersing agents for rubber and similar materials and as substitutes for alkalis and other preservatives in maintaining dispersion of latex. In such use, they are much superior to ammonia, since they have an equal or better effect in preventing coagulation and are not lost by evaporation. They may hence be employed in the concentration of rubber latex and preserve the latex against coagulation during and after concentration.

They may be employed to form resinous bodies by condensation with polyhydric acids and their anhydrides such as phthalic acid, tartaric acid and the like, or by condensation with urea. Small proportions of these olefin-polyamines act as accelerators for the condensation of phenols and methylene bodies such as formaldehyde, hexamethylenetetramine and the like.

They may be employed for the removal of acid constituents of gases, such as carbon dioxide, sulfur dioxide and hydrogen sulfide, since they are readily soluble in water, their salts with these acid gases remain soluble, and the resulting compounds are readily decomposed upon heating, giving off the gas and regenerating the polyamines. In such cases, a polyamine may be selected of a high boiling point and high combining weight, thereby having increased absorption capacity for such acid constituents of gases and reducing losses on regeneration.

I claim:

1. The method of producing olefin-polyamines which comprises heating an olefin dihalide with ammonia in the presence of water in amount at least seven times the amount of the polyhalide to a reacting temperature of at least 120° C. and preferably not over 300° C.

2. The method of producing olefin-polyamines which comprises heating an olefin dihalide and ammonia in the presence of water in amount of at least seven times the weight of the ammonia and a minor proportion of alcohol to a reaction temperature of from at least 120° C. to around 300° C.

3. The method of producing olefin polyamines which comprises heating the dihalide of a normally gaseous olefin with ammonia in the presence of water in amount at least seven times the weight of the ammonia to a reaction temperature of at least 120° C. and preferably not over 300° C.

4. The method of producing ethylene polyamines which comprises heating an ethylene dihalide with ammonia and water in the amount of at least seven times the amount of the olefin dihalide to a reaction temperature of from at least 120° C. to around 300° C.

5. The method of producing olefin-polyamines which comprises admixing an olefin dihalide with ammonia and water, the proportion of water being at least seven times by weight that of ammonia, and heating the reaction mixture under superatmospheric pressure to a temperature of 140 to 150° C.

6. The method of producing ethylene polyamines which comprises bringing into a heating zone a mixture of an ethylene dihalide, ammonia and water, the proportion of water being at least seven times the proportion of ammonia by weight, and bringing the reaction mixture to a temperature of 140° C. to 150° C.

7. The method of producing olefin-polyamines which comprises passing vapors of a dihalide of a normally gaseous olefin, ammonia and water, said water being in amount in excess of seven times the amount of ammonia, through a heated tube and bringing the mixed vapors therein to a temperature of from at least 120° C. to around 300° C.

8. The method of producing ethylene polyamines which comprises heating ethylene dibromide with ammonia in the presence of water in amount of at least seven times the weight of the ammonia to a temperature of from at least 120° C. to around 300° C.

9. The method of producing ethylene polyamines which comprises heating ethylene diiodide with ammonia in the presence of water in amount of at least seven times the weight of the ammonia to a temperature of from at least 120° C. to around 300° C.

10. The method of producing propylene polyamines which comprises heating a propylene dihalide with ammonia in the presence of water in amount of at least seven times the weight of the ammonia to reaction temperatures ranging from at least 120° C. to around 300° C.

11. The method of producing mixed olefin-polyamines which comprises heating a mixture of olefin-polyhalides with ammonia in the presence of water in amount of at least seven times the weight of the ammonia to a temperature of from at least 120° C. to around 300° C.

NATHAN M. MNOOKIN.